United States Patent [19]

Finet

[11] Patent Number: 5,370,067
[45] Date of Patent: Dec. 6, 1994

[54] METHOD OF INCINERATING SOLID COMBUSTIBLE MATERIALS, ESPECIALLY URBAN WASTE

[75] Inventor: Claude Finet, Issy-les-Moulineaux, France

[73] Assignee: T.I.R.V. - Traitement Industriel des Residus Urbains, Paris, France

[21] Appl. No.: 191,642

[22] Filed: Feb. 4, 1994

[30] Foreign Application Priority Data

Feb. 4, 1993 [FR] France ................... 93 01204

[51] Int. Cl.$^5$ ............................... F23G 5/00
[52] U.S. Cl. ................... 110/346; 110/165 A; 110/204; 110/214; 110/234
[58] Field of Search ............ 110/346, 204, 165 A, 110/234, 233, 214

[56] References Cited

U.S. PATENT DOCUMENTS

| | | | |
|---|---|---|---|
| 4,106,892 | 8/1978 | Haga et al. | 432/58 |
| 4,539,188 | 9/1985 | Hirsch et al. | 423/210 |
| 5,022,329 | 6/1991 | Rackley et al. | 110/234 |
| 5,237,940 | 8/1993 | Pieper et al. | 110/346 |
| 5,309,850 | 5/1994 | Downs et al. | 110/235 |

FOREIGN PATENT DOCUMENTS

| | | |
|---|---|---|
| 0118931 | 9/1984 | European Pat. Off. . |
| 0446888 | 9/1991 | European Pat. Off. . |
| 0479267 | 4/1992 | European Pat. Off. . |
| 2357843 | 2/1978 | France . |
| 3939344 | 6/1991 | Germany . |

*Primary Examiner*—Edward G. Favors
*Attorney, Agent, or Firm*—Longacre & White

[57] ABSTRACT

Urban waste is dried and burned in a mechanical grate furnace in a reducing atmosphere to reduce the formation of $NO_x$. Consumption of the clinker is completed in a well at the base of which a device such as a plasma torch is provided for vitrifying the clinker. The combustion gases are burned in the presence of secondary air in a circulating fluidized bed furnace. Most of the fly ash is removed from the flue gases in a filter before the gases are passed through a boiler in which they are cooled. The flue gases then pass through a conventional cleansing area from which they are evacuated by a stack. There are very low concentrations of harmful products in the flue gases and in the clinker. The fly ash collected on the exit side of the fluidized bed is recycled with the clinker to be vitrified. Heavy metals evaporated in the furnaces are recovered via a purge.

9 Claims, 1 Drawing Sheet

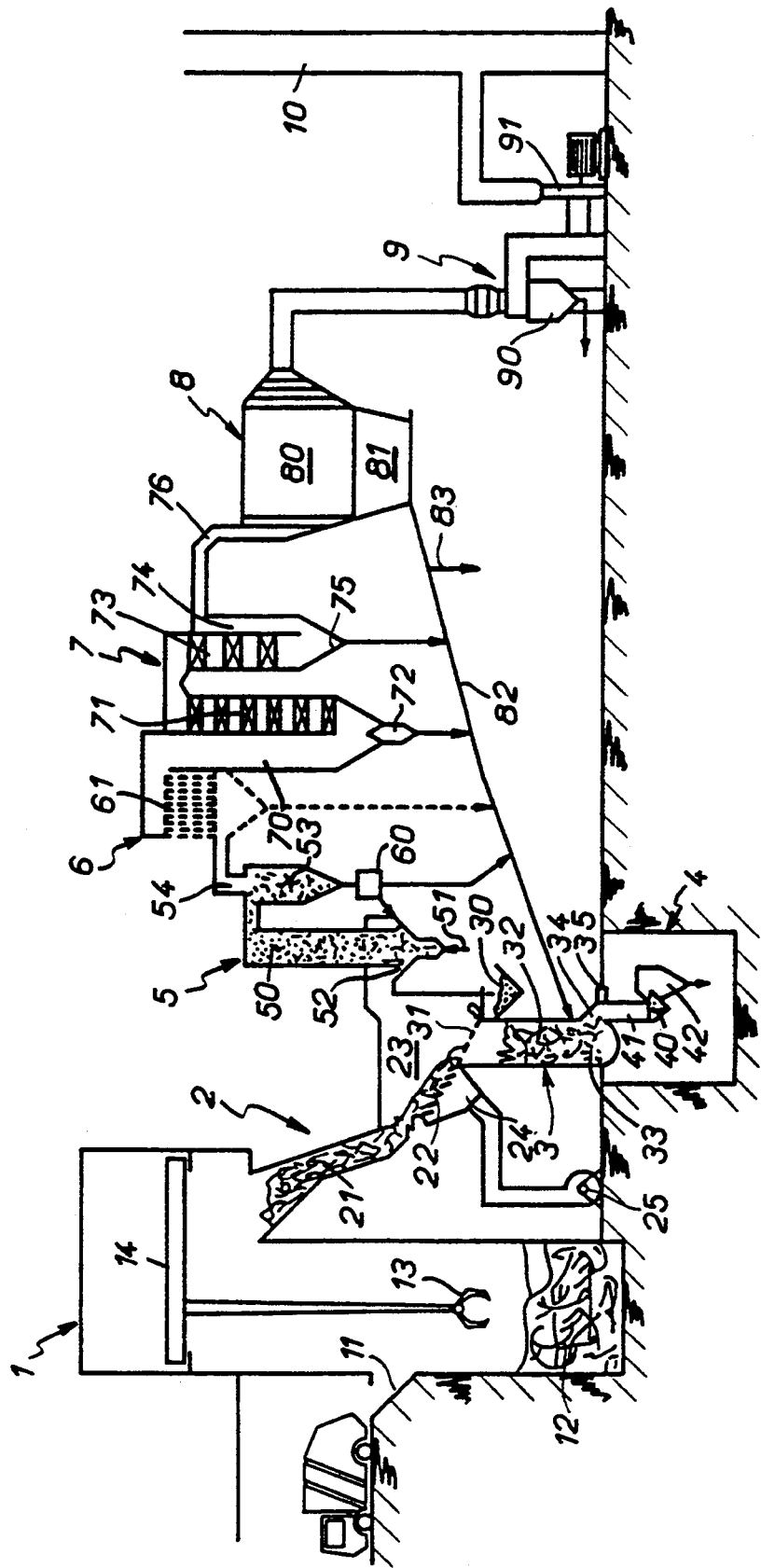

METHOD OF INCINERATING SOLID COMBUSTIBLE MATERIALS, ESPECIALLY URBAN WASTE

BACKGROUND OF THE INVENTION

1. Field of the Invention

The invention concerns a method of incinerating combustible materials, especially urban waste, producing solids and gases which are substantially harmless to the environment. In this method the combustible materials are introduced into a controlled feed furnace and burned in contact with a flow of primary air. Combustion gases are emitted containing particulate unburned materials and gasified fractions whereas non-volatile fractions are consumed thus producing clinker. Secondary air is added to the combustion gases emitted to oxidize the particulate unburned materials and combustible gasified fractions thus generating flue gases and fly ash. The flue gases are passed through a heat exchanger in order to extract heat from them and then into a cleansing area in which the fly ash is separated out and collected and harmful gases are neutralized.

2. Description of the Prior Art

At present, in France, almost 40% of urban waste is incinerated. The process has been developed to a very high technical level, with a combustion efficiency of 98% to 99%, concentrations of unburnt materials that can be as low as 1%, energy efficiencies of 80% to 85% and installation availabilities of 85% to 90%.

At the same time, emission of pollutants has been significantly reduced. Despite such improvements, incineration plant has the reputation of being a source of pollution, possibly because the reduction in emission of pollutants has gone hand in hand with increases in plant size and in the quantities of material processed.

What is more, parallel methods of eliminating these waste materials do not seem to be likely to supplant incineration: landfill will be drastically curtailed in the future, being authorized only for harmless residues from other processes; sorting techniques such as selective collection can be applied only to recoverable waste, representing at best 15% to 20% of the total amount of urban waste; in the best case scenario, composting could handle only a maximum of 45% of the waste collected, and represents no advance over conventional incineration in the case of some pollutants such as heavy metals.

It follows that reducing the pollution associated with the elimination of urban waste cannot be achieved by abandoning incineration and this implies that incineration methods need to be improved so that their byproducts are harmless to the environment.

These byproducts are essentially of two kinds, those discharged into the atmosphere in the form of gas and vapor (airborne) and those of solid form such as clinker and fly ash.

The former comprise mostly nitrogen, carbon dioxide and water vapor, with a small proportion of pollutant gas and vapor. Some of these pollutants are already eliminated in large part by appropriate processing:
particulate heavy metals and dust;
hydrogen chloride gas;
carbon monoxide and gaseous hydrocarbons;
volatile heavy metals (mercury).

Current treatment methods are open to improvement.

Other gaseous pollutants require action (nitrogen oxides, sulfur compounds, dioxins and other organic compounds). Some of these are unavoidable (dust, volatile heavy metals, sulfur oxides); others are the result of combustion conditions (nitrogen oxides $NO_x$, dioxins, CO and various organic compounds); in the case of sulfur compounds the combustion conditions can vary the relative proportions of $SH_2$, $SO_2$ and $SO_3$.

The solid byproducts comprise clinker and the byproducts of flue gas cleansing; they have usually been regarded as harmless to the environment. Following removal of metal debris, clinker has often been used in civil engineering works, for example.

However, recent studies have shown that when exposed to rainwater the solid byproducts can discharge soluble fractions including chlorides, sulfates and heavy metals, in concentrations that could be regarded as excessive in the foreseeable future.

The object of the present invention is to reduce airborne and solid pollutants to a level compatible with foreseeable regulations one decade from now.

SUMMARY OF THE INVENTION

The invention consists in a method of incinerating solid materials, especially urban waste, producing byproducts which are substantially harmless to the environment in which method the combustible materials are placed in a controlled feed furnace and burned in contact with a flow of primary air thus emitting combustion gases containing particulate unburned materials and gasifiled fractions whereas non-volatile fractions are consumed thus producing clinker, and the combustion gases have secondary air added to them to oxidize the particulate unburned materials and combustible gasified fractions thus producing flue gases and fly ash, the flue gases then passing through a heat exchanger in which heat is recovered from them and then through a cleansing area in which fly ash is separated and collected and harmful gases are neutralized, in which method:

the flow of primary air is metered so that combustion in the furnace takes place in a reducing environment;
to complete consumption of said clinker it is decanted into a brazier area with the terminal section equipped with heat energy injector means adapted to fuse the clinker before it is removed through a water seal in which it is extinguished;
said combustion gases are injected with said secondary air into a fluidized bed secondary furnace;
the fly ash leaving said secondary furnace with said flue gases is collected at at least one point on the upstream side of said cleansing area; and
the fly ash collected at said point of the upstream side of said cleansing area and in the latter is recycled into said brazier area on the entry side of said terminal section.

The combination of combustion in a reducing environment in the controlled feed furnace with oxidation of the combustion gases in the circulating fluidized bed furnace reduces the temperature of the combustion gases and so minimizes the formation of $NO_x$ in this furnace, while the heat content of the combustion gases is increased and oxidation of the particulate unburned materials and gasified fractions is very substantially complete because of the intimate contact achieved between the combustible fractions and the secondary air in the circulating fluidized bed, combined with a low temperature gradient. Consequently the flue gases from the fluidized bed furnace are low in $NO_x$, dioxins and furanes while the sulfur compounds are in the form of SO$_2$ and SO$_3$, which are more easy to capture using basic products.

Simultaneously the fly ash accompanying the flue gases is low in combustible fractions and is held back in the solid/gas separator on the output side of the circulating fluidized bed furnace, which reduces soiling and improves heat exchange.

The decanting of the clinker in the brazier area, apart from the fact that it enables the use of a shorter controlled feed furnace than in prior art installations helps to form a mass of clinker that is sufficiently porous for it to be consumed completely and sufficiently dense for it not to cool too quickly, this mass being offered up progressively to the heat injection means which fuses the clinker, burns off any remaining combustible part and evaporates any part that can be evaporated, the gases formed by this means in the terminal section accompanying the gasified fractions in the circulating fluidized bed furnace. The fused clinker drops into the water seal to form vitrified fragments separated from each other by fracture surfaces caused by thermal shock. Vitrification renders insoluble most of the mineral compounds that have not been evaporated in the terminal section of the brazier area. The fragmented vitrified clinker can be used for landfill or in civil engineering works without harm to the environment.

A first result of recycling the fly ash in the brazier area is to improve the oxidation of the combustible fractions carried by the ash and to enrich them with non-oxidizable components, while their fixed components are vitrified with the clinker. The condensible heavy metals are collected along with the fly ash, which is enriched with heavy metal compounds as the combustible fractions are oxidized and the vitrifiable fractions are eliminated with the clinker. In this way the concentration of heavy metals in the fly ash can be modified to the point where extracting them is cost-effective.

Before it is decanted into the brazier area, the clinker is preferably screened to eliminate large incompatible foreign bodies. Urban waste commonly includes metal items such as bicycle frames, bed frames, sewing machines and also rocks. Melting foreign bodies like these would be somewhat hit and miss, would entail excessive energy consumption and could impede the vitrification of the clinker.

A powdered substance is preferably introduced into the circulating fluidized bed furnace containing a sufficient quantity of calcium oxide to neutralize substantially the sulfur compounds, which are essentially SO$_2$ and SO$_3$. In contact with sulfur oxides in the fluidized bed, the calcium oxide (which may be added in the form of quicklime or limestone which decomposes into CaO and CO$_2$) yields calcium sulfides and sulfates which are entrained with the fly ash, effectively reducing the sulfur oxide content of the flue gases.

To improve the collection of fly ash in the flue gases before the latter enters the heat exchanger they may be passed through a solid/gas separator, for example, provided with a filter adapted to withstand the temperature of the flue gases passing through it. This can further reduce soiling of the heat exchanger.

The heat exchanger is usually a steam generator boiler. For high installation powers steam generation is the most efficient heat recovery process, whether the steam is used to generate electrical power or fed direct to users.

A plurality of hoppers may be provided at the bottom of the boiler to collect fly ash to be recycled to the brazier area along with the fly ash collected on the entry side of and in the cleansing area. Condensed heavy metals will tend to accumulate in these hoppers, the temperature of the flue gases decreasing as they give up their sensible heat to the boiler water and steam.

A purge outlet is provided on a pipe through which the fly ash collected at various points in the flue gas circuit is recycled into the brazier area in order to recover the fly ash enriched with heavy metals.

Secondary features and the advantages of the invention emerge from the following description given by way of example with reference to the single figure of the accompanying drawing.

BRIEF DESCRIPTION OF THE DRAWING

The drawing is a diagram showing an installation for incinerating urban waste using the method of the invention.

DETAILED DESCRIPTION OF THE INVENTION

The installation includes a silo 1 with a ramp 11 for off loading urban waste, brought to the installation by truck, for example, to constitute a reserve 12 from which the waste is removed by handling means 13 carried by a travelling overhead crane.

The urban waste is placed in an inlet chute 21 of a controlled feed furnace 2. The furnace 2 has an inclined grate 22 of the type with staggered rows of alternately fixed and mobile bars so that the burning waste is moved progressively from the entry end of the grate 22 to its exit end. A blower box 24 under the grate is fed with primary combustion-supporting air by a fan 25. The entry chute 21 and the grate 22 are conventional in themselves. although the grate 22 is shorter than in prior art installations because, as emerges below, its downstream support part does not constitute all of the brazier area.

A flue gas chamber 23 above the grate collects combustion gases resulting from combustion of the waste on the grate 22. The outlet end of the grate 22 is extended by an inclined riddle 31 through which the clinker resulting from combustion of non-volatile fractions of the waste drops into a well 3 forming a brazier area. Any large and especially non-combustible foreign bodies reaching the riddle 31 fail to pass through it and are collected in a dead-end from which they are removed to a dumpster 30 through an air lock at appropriate times.

The combustible non-volatile fractions remaining in the cinder are fully consumed in the brazier area formed by the well 3, which is fed with primary air. The lower end part of the well 33 forms a crucible and includes a charging door 34 in front of which are disposed heat injection means 35 such as a plasma torch, an electric burner or an oxygen burner. The clinker collecting in the well 32 forms a magma the bottom part of which is fused in the crucible 33 and drops through the charging door 34 and a vertical passage 41 into a tank 40 filled with water. This forms a water seal to the atmosphere to prevent pressurized combustion gases escaping with the vitrified clinker and air entering the flue gas chamber 23 via the charging door 34 if the pressure in the chamber is lower than atmospheric pressure.

The fused clinker, which forms coarse glass, drops into the water in the tank 40 to form a vitrified mass fragmented by the stresses due to thermal shock. This process is known as cracking of a vitreous product. The fragmented vitreous mass is periodically scraped off into a hopper 42. The composition of this vitreous mass is similar to cement clinker and this material can therefore be used in the construction and repair of roads, for example.

The particulate unburned materials and combustion gases from the burning waste on the grate 22 and the clinker in the well 3 collected by the chamber 23 are injected into a circulating fluidized bed furnace 5 at the base of a tower containing the fluidized bed. The fluidized bed comprises a granular refractory material with a graded particle size. Secondary air is fed into the base 51 of the tower, at the center, in order to fluidize the granular refractory material. The combustion gases and recycled refractory material enter under a circumferential lip 52. The combustion gases and the secondary air are in intimate contact throughout the height of the tower, because of the turbulence caused by fluidization of the refractory material, with the result that the oxidizable fractions of the combustion gases combine with the oxygen of the secondary air. The granular refractory material constituting the fluidized bed forms a mass of high thermal inertia raised to a high temperature with the result that the combustion of the combustible fractions of the combustion gases and the particulate unburned materials is effected at a substantially constant temperature, this combustion maintaining the temperature of the fluidized bed.

Powdered lime is injected at 51 along with the secondary air in amounts calculated to neutralize the sulfur compounds which are mainly $SO_2$ and $SO_3$ in the oxidizing atmosphere of the fluidized bed. This produces calcium sulfites and sulfates.

The refractory material of the fluidized bed overflows at the top of the tower 50 and drops into a cyclone type solid/gas separator 53. The flue gases from the tower 5 pass out through a central pipe 54, becoming separated from the fluidized bed and from the fly ash with which they were laden.

The central pipe 54 has evaporator tubes connected to the boiler 7 in order to limit the temperature of the flue gases.

A riddle 60 at the base of the cyclone 53 separates the grains of the fluidized bed material from the deposited fly ash. The grains of the fluidized bed material are recycled to the base of the tower 50 via the circumferential lip 52 while some of the fly ash can be evacuated through the pipe 60a.

The central pipe 54 feeds into a separator body 6 including a filter 61 for blocking fly ash in the flow of high temperature flue gases and having refractory filter surfaces.

The filter 61 discharges into a heat exchanger 7 in the form of a boiler comprising two stages 70, 71 and 73, 74 in series. The first stage comprises a downward path 70 followed by an upward second path 71 on which most of the boiler tubes are disposed. The lower part of the first stage between the downward path 70 and the upward path 71 is shaped as a hopper 72 for collecting fly ash. The second stage also includes a downward path 73 on which boiler tubes and a reheater are situated followed by an upward path 74. The second stage is also shaped as a hopper 75 to collect fly ash where the two paths 73 and 74 join. The flue gases are progressively cooled as they flow through the boiler 7 which constitutes the heat exchanger. The cross-sections of the paths 70, 71, 73, 74 are therefore of decreasing size in order to maintain the rate of flow of the flue gases within appropriate limits. This progressive cooling is accompanied by the formation of solid materials which condense out of the volatile substances in the flue gases.

On leaving the boiler 7 the flue gases pass through a conventional cleansing area 8 including a filter box 80 and a hopper 81 for collecting materials separated out by the filter 80. The hopper 81 collects most of the heavy metals entrained in the flue gases, mainly in the form of metal oxides and chlorides (zinc, lead, cadmium). Beyond the cleansing area 8 the flue gases are passed through a washing unit 90 in a final cleansing section 9 which retains the hydrogen chloride and the mercury which were not separated out by the filter 80, whence they are discharged into a stack 10 by a fan 91.

The fly ash and other solid materials condensed out of the cooling flue gases, collected in the cyclone 53 of the circulating fluidized bed boiler, in the hoppers 72 and 75 of the boiler 7 and in the hopper 81 of the cleansing area 8 are recycled to the brazier area 3 on the immediate entry side of the charging door 34 via a return pipe 82 which is equipped with a purge 83 immediately on the output side of the hopper 81 of the cleansing area 8.

The operating conditions of the various areas of the installation condition the execution of the method of the invention.

The urban waste dropping onto the grate 22 from the chute 21 is dried before it is ignited. The quantity of primary air fed to the blower box 24 under the grate 22 is determined so that the combustion gases in the flue gas chamber 23 contain a high proportion of CO and so that the temperature of the combustible mass on the grate 22 is relatively low, so that very small quantities of nitrogen oxide ($NO_x$) are formed here. The quantity of air fed into the well 32 of the brazier area is also determined so that consumption of the clinker can be completed under weakly oxidizing conditions. The fusion of the clinker in the terminal section of the crucible 33 of the brazier area 32 is designed to minimize the production of nitrogen oxides, the atmosphere in this terminal section containing very little oxygen and the feed of extra air being adjusted to the precise value required for consumption of the clinker.

The combustion gases from the chamber 23 are injected into the base of the tower 50 of the circulating fluidized bed furnace 5 at the same time as the secondary air laden with lime. As combustion of the combustion gases and the particulate combustible materials in the circulating bed occurs within a relatively narrow range of temperatures, because of the thermal inertia of the mass of granular refractory material of the fluidized bed, operation with excess secondary air does not entail any risk of increasing the $NO_x$ concentration; the concentration of CO in the flue gases at the exit 54 is very low; also the sulfur is oxidized, which favors the capture of the sulfur in the form of sulfate.

The fusion of the clinker and fly ash in the crucible 33 of the brazier area renders the vitreous components insoluble while the final combustible fractions of the clinker are burned and the volatile components are distilled.

The powder and condensates collected in the hopper 81 of the cleansing area 8, where the flue gases are cool, are progressively enriched with heavy metals due to the recycling. A material rich in heavy metals which can be extracted and separated at low cost is obtained from the purge 83.

By reducing the amounts of unburned materials, fly ash and harmful substances on the upstream side of the boiler 7 soiling of the boiler is reduced and the medium-term thermal efficiency of the installation is increased. As a secondary benefit, corrosion of the boiler elements is reduced.

Of course, the invention is not limited to the example described but encompasses all variant executions thereof within the scope of the claims.

The controlled feed furnace is not necessarily a grate furnace with alternately fixed and mobile bars which reciprocate, for example, but can instead be a furnace with endless layer grates or a rotary furnace; large objects need not be separated from the clinker prior to entry into the brazier area, but can be melted at the same time as the clinker fused if the power of the torches 35 needed for normal operation is sufficient, or at the very least only exceptionally large objects are separated from the clinker. Finally, the heat exchanger can be of any kind, including a single-stage or multistage boiler, with either longitudinal or vertical alternating paths.

THERE IS CLAIMED:

1. Method of incinerating solid materials, especially urban waste, producing byproducts which are substantially harmless to the environment in which method combustible materials are placed in a controlled feed furnace and burned in contact with a flow of primary air to emit combustion gases containing particulate unburned materials and gasified fractions whereas nonvolatile fractions are consumed thus producing clinker, and the combustion gases have secondary air added to them to oxidize the particulate unburned materials and combustible gasified fractions thus producing flue gases and fly ash, the flue gases then passing through a heat exchanger in which heat is recovered from them and then through a cleansing area in which fly ash is separated and collected and harmful gases are neutralized, in which method:

the flow of primary air is metered so that combustion in the furnace takes place in a reducing environment;

to complete consumption of said clinker it is decanted into a brazier area with the terminal section equipped with heat energy injector means adapted to fuse the clinker before it is removed through a water seal in which it is extinguished;

said combustion gases are injected with said secondary air into a fluidized bed secondary furnace;

the fly ash leaving said secondary furnace with said flue gases is collected at at least one point on the upstream side of said cleansing area; and the fly ash collected at said point of the upstream side of said cleansing area and in the latter is recycled into said brazier area on the entry side of said terminal section.

2. Method according to claim 1 wherein said clinker is riddled to eliminate large foreign bodies before it is decanted into said brazier area.

3. Method according to claim 1 wherein said fluidized bed of said secondary furnace is a circulating fluidized bed.

4. Method according to claim 3 wherein a powdered component is introduced into said fluidized bed furnace containing calcium oxide in sufficient quantities substantially to neutralize the sulfur compounds.

5. Method according to claim 1 wherein the flue gases from said secondary furnace are passed through a solid/gas separator in which a major part of the fly ash is collected before they are passed through said heat exchanger.

6. Method according to claim 5 wherein said solid/gas separator between said secondary furnace and said heat exchanger includes a filter adapted to withstand temperatures equal to those of the glue gases on the entry side of said heat exchanger.

7. Method according to claim 1 wherein said heat exchanger is a steam generator boiler.

8. Method according to claim 7 wherein said boiler has a plurality of hoppers at the bottom to connect fly ash which is recycled into said brazier area with the fly ash collected on the entry side of said cleansing area and in the latter.

9. Method according to claim 1 wherein the fly ash is recycled to said brazier area via a pipe equipped with a purge.

* * * * *